United States Patent
Li et al.

(10) Patent No.: US 12,382,393 B2
(45) Date of Patent: Aug. 5, 2025

(54) METHOD FOR CONTROLLING TERMINAL DEVICE, TERMINAL DEVICE AND NETWORK DEVICE

(71) Applicant: GUANGDONG OPPO MOBILE TELECOMMUNICATIONS CORP., LTD., Guangdong (CN)

(72) Inventors: Haitao Li, Guangdong (CN); Yi Hu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 319 days.

(21) Appl. No.: 18/155,709

(22) Filed: Jan. 17, 2023

(65) Prior Publication Data
US 2023/0156599 A1    May 18, 2023

Related U.S. Application Data

(63) Continuation of application No. PCT/CN2020/116593, filed on Sep. 21, 2020.

(51) Int. Cl.
*H04W 52/02*    (2009.01)
*H04W 76/27*    (2018.01)
*H04B 7/185*    (2006.01)

(52) U.S. Cl.
CPC ....... *H04W 52/0225* (2013.01); *H04W 76/27* (2018.02); *H04B 7/18513* (2013.01)

(58) Field of Classification Search
None
See application file for complete search history.

(56) References Cited

U.S. PATENT DOCUMENTS

| 10,506,483 B1 | 12/2019 | Williamson et al. | |
| 2021/0218458 A1* | 7/2021 | Kung | H04W 80/02 |
| 2022/0132388 A1* | 4/2022 | Ishii | H04W 76/19 |
| 2022/0217599 A1* | 7/2022 | Kim | H04W 36/0058 |

(Continued)

FOREIGN PATENT DOCUMENTS

| CN | 109565719 A | 4/2019 |
| WO | 2020092561 A1 | 5/2020 |
| WO | 2022056929 A1 | 3/2022 |

OTHER PUBLICATIONS

Thales(Email discussion rapporteur), "[108#06][NTN] Earth fixed vs. Earth moving cells in NTN LEO(Thales)," R2-1916351, 3GPP TSG-RAN WG2 Meeting #108, Reno, USA, Nov. 18-22, 2019, all pages.

(Continued)

*Primary Examiner* — Anh Vu H Ly
(74) *Attorney, Agent, or Firm* — Ladas & Parry, LLP

(57) ABSTRACT

Embodiments of the present application provide a method for controlling a terminal device, a terminal device and a network device which are applied to the field of communication technology. An embodiment of the present application includes: receiving first indication information sent by a network device, where the first indication information is used to indicate that a radio link between a terminal device and the network device is in an interrupted state; resetting a MAC entity and/or stopping N processes in the terminal device according to the first indication information, where N is an integer greater than or equal to 1.

20 Claims, 5 Drawing Sheets

A network device sends first indication information to a terminal device — 401

The terminal device resets a MAC entity and/or stops N processes in the terminal device according to the first indication information — 402

The terminal device starts M processes of the N processes — 403

(56) References Cited

U.S. PATENT DOCUMENTS

| | | | |
|---|---|---|---|
| 2022/0217806 A1* | 7/2022 | Jo | H04W 76/19 |
| 2022/0361082 A1* | 11/2022 | Wu | H04W 72/40 |
| 2023/0012892 A1* | 1/2023 | Wu | H04L 5/0037 |
| 2023/0308167 A1* | 9/2023 | Lee | H04W 76/19 |

OTHER PUBLICATIONS

Qualcomm Incorporated, "Handover Latency Improvements", R2-154810, 3GPP TSG-RAN WG2 Meeting #91 bis, Malmo, Sweden, Oct. 5-9, 2015, all pages.

CATT, "Discussion for beam management and feeder link switch enhancement," R1-2005709, 3GPP TSG RAN WG1 #102-e, e-Meeting, Aug. 17-28, 2020, all pages.

The Extended European Search Report of corresponding European patent application No. 20953787.7, dated Jul. 6, 2023.

International Search Report (ISR) dated Jun. 9, 2021 for PCT Application No. PCT/CN2020/116593.

Written Opinion (WOSA) dated Jun. 9, 2021 for PCT Application No. PCT/CN2020/116593.

CENC, " Discussion on feeder link hard switch in NTN LEO," R2-2006547, 3GPP TSG-RAN WG2 #111e, Aug. 17-28, 2020, all pages.

CATT, Huawei, HiSilicon, "TP on Feeder Link Switch," R2-1916386, 3GPP TSG-RAN WG2 Meeting 108, Reno, USA, Nov. 18-22, 2019, all pages.

3GPP TR 38.821 V1.0.0 (Dec. 2019); 3rd Generation Partnership Project; Technical Specification Group Radio Access Network; Solutions for NR to support non-terrestrial networks (NTN) (Release 16), all pages.

The first examination report of corresponding European patent application No. 20953787.7, dated Mar. 31, 2025.

* cited by examiner

METHOD FOR CONTROLLING TERMINAL DEVICE, TERMINAL DEVICE AND NETWORK DEVICE

CROSS-REFERENCE TO RELATED APPLICATION

This application is a continuation of International Application No. PCT/CN2020/116593, filed on Sep. 21, 2020, the content of which is incorporated herein by reference in its entirety.

TECHNICAL FIELD

The present application relates to the field of communication technology and, in particular, to a method for controlling a terminal device, a terminal device and a network device.

BACKGROUND

In a non terrestrial network (NTN), during movement of a satellite, hard switch of a feeder link (i.e., a link between the satellite and a terrestrial gateway) (hard feeder link switch) may be carried out between two terrestrial gateways. During the hard switch, the satellite may not be connected to any terrestrial gateway for a period of time. Within this period of time, a radio link between a base station and a terminal device is interrupted. The base station cannot send a downlink signal or receive an uplink signal. But the terminal device cannot know. Therefore, the terminal device will still perform invalid behaviors such as measurement related to the radio link and uplink transmission, which increases power consumption of the terminal device.

SUMMARY

Embodiments of the present application provide a method for controlling a terminal device, a terminal device and a network device. The network device can indicate to the terminal device that a radio link between the terminal device and the network device is in an interrupted state, so that the terminal device can avoid performing invalid behaviors such as measurement related to the radio link and uplink transmission, thus reducing power consumption of the terminal device.

In a first aspect, a method for controlling a terminal device is provided, including:
  receiving first indication information sent by a network device, where the first indication information is used to indicate that a radio link between a terminal device and the network device is in an interrupted state;
  resetting a media access control MAC entity and/or stopping N processes in the terminal device according to the first indication information, where N is an integer greater than or equal to 1.

In a second aspect, a method for controlling a terminal device is provided, including: sending first indication information to a terminal device, where the first indication information is used to indicate that a radio link between the terminal device and a network device is in an interrupted state.

In a third aspect, a terminal device is provided, including:
  a receiving module, configured to receive first indication information sent by a network device, where the first indication information is used to indicate that a radio link between the terminal device and the network device is in an interrupted state;
  a processing module, configured to reset a MAC entity and/or stop N processes in the terminal device according to the first indication information, where N is an integer greater than or equal to 1.

In a fourth aspect, a network device is provided, including:
  a sending module, configured to send first indication information to a terminal device, where the first indication information is used to indicate that a radio link between the terminal device and the network device is in an interrupted state.

In a fifth aspect, a terminal device is provided, including: a processor, a memory, and a computer program that is stored on the memory and runnable on the processor, and when the computer program is executed by the processor, the method for controlling a terminal device according to the first aspect is implemented.

In a sixth aspect, a network device is provided, including: a processor, a memory, and a computer program that is stored on the memory and runnable on the processor, and when the computer program is executed by the processor, the method for controlling a terminal device according to the second aspect is implemented.

In a seventh aspect, a computer-readable storage medium including computer instructions is provided, and when the computer instructions are run on a computer, the computer is caused to execute the method according to the first aspect or any optional implementation of the first aspect, or to execute the method according to the second aspect or any optional implementation of the second aspect.

In an eighth aspect, a computer program product including computer instructions is provided, and when the computer program product is run on a computer, the computer runs the computer instructions to cause the computer to execute the method according to the first aspect or any optional implementation of the first aspect, or to execute the method according to the second aspect or any optional implementation of the second aspect.

In a ninth aspect, a chip is provided, and the chip is coupled with a memory in a terminal device, to cause the chip to call program instructions stored in the memory at runtime, so that the terminal device executes the method according to the first aspect or any optional implementation of the first aspect, or the network device executes the method according to the second aspect or any optional implementation of the second aspect.

In the embodiments of the present application, the network device can indicate to the terminal device that the radio link between the terminal device and the network device is in the interrupted state, so that the terminal device can reset the MAC entity, and/or stop the N processes in the terminal device. In this way, it is avoided that the terminal device performs uplink transmission related to a MAC layer and retransmission, and some invalid behaviors of the terminal device (for example, a measurement process, a reporting process of a measurement result, a random access attempt, and a process of sounding reference signal SRS transmission, etc.) are avoided, which can reduce the power consumption of the terminal device.

DESCRIPTION OF EMBODIMENTS

Figure 1:
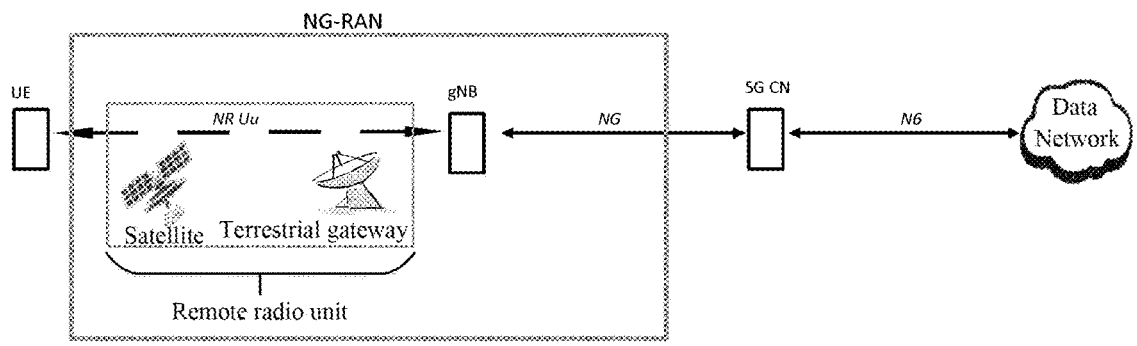
FIG. 1 is a schematic diagram of a transparent payload satellite network architecture provided by an embodiment of the present application.

The technical solutions in embodiments of the present application will be described in combination with accompanying drawings in the embodiments of the present application. Obviously, the described embodiments are only part of the embodiments of the present application, not all of them. Based on the embodiments of the present application, all other embodiments obtained by those skilled in the art without creative effort belong to the scope of the present application.

In the embodiments of the present application, terms such as "exemplary" or "for example" are used as an example, an illustration or a description. Any embodiment or design solution described as "exemplary" or "for example" in the embodiments of the present application shall not be interpreted as more preferred or advantageous than other embodiments or design solutions. Specifically, the use of the terms such as "exemplary" or "for example" is intended to present relevant concepts in a specific way.

In the related art, 3GPP is studying NTN technology. The NTN technology generally provides a communication service to a terrestrial user by means of satellite communication. Compared with terrestrial cellular network communication, satellite communication has the following advantages.

First of all, satellite communication is not limited by a user's region. For example, general land communication cannot cover areas such as an ocean, a mountain and a desert where a communication device cannot be set up or where communication coverage is not available due to sparse population. For satellite communication, since a satellite can cover a larger ground and the satellite can orbit around the earth, theoretically every corner of the earth can be covered by satellite communication.

Secondly, satellite communication has greater social value. Satellite communication can provide coverage at a lower cost in a remote mountain area, a poor and backward country or region, so that people in these regions can enjoy advanced voice communication and mobile Internet technology, which is conducive to narrowing digital divide with developed regions and promoting development of these regions.

Thirdly, a satellite communication distance is long, and a communication cost does not increase significantly with an increase of communication distance. Finally, satellite communication has high stability and is not limited by a natural disaster.

Communication satellites can be divided into a low-earth orbit (low-Earth orbit, LEO) satellite, a medium-earth orbit (MEO) satellite, a geostationary earth orbit (GEO) satellite, a high elliptical orbit (HEO) satellite and so on according to different orbit altitude. At present, LEO and GEO are mainly studied.

1. LEO

An altitude range of a low orbit satellite is 500 km~1500 km, and a corresponding orbital period is about 1.5 hours~2 hours. A signal propagation delay of single-hop communication between a user device and the satellite is generally less than 20 ms. A maximum satellite visible time is 20 minutes. A signal propagation distance is short, a link loss is small, and a transmit power requirement for a user terminal is not high.

2. GEO

A geostationary Earth orbit satellite has an orbit altitude of 35786 km and a rotation period around the earth of 24 hours. A signal propagation delay of single-hop communication between a user device and the satellite is generally 250 ms.

In order to ensure satellite coverage and improve system capacity of an entire satellite communication system, the satellite uses multiple beams to cover the ground. A satellite can form tens or even hundreds of beams to cover the ground, and a satellite beam can cover a terrestrial area with a diameter of tens of kilometers to more than a hundred kilometers.

At present, 3GPP considers two satellite network architectures. One is transparent payload satellite network architecture, and the other is regenerative payload satellite network architecture.

Exemplary, FIG. 1 a schematic diagram of a transparent payload satellite network architecture, which includes a user equipment (UE), a 5G access network (NG-RAN), a 5G core network (5G CN) and a data network, where the 5G access network includes a base station (gNB), a satellite and a terrestrial gateway (NTN gateway). The UE and the gNB are connected through a new radio (NR) Uu interface (i.e., a universal user network interface), the base station and the 5G core network (5G CN) are connected through an NG interface, and the 5G core network and the data network are connected through an N6 interface. The satellite and the terrestrial gateway form a remote radio unit (RRU). In a process of data transmission between the UE and the gNB, the satellite and the terrestrial gateway will forward the data, and the satellite and the terrestrial gateway do not perform protocol stack processing on the data during the forwarding, so as to achieve transparent payload.

Figure 2:
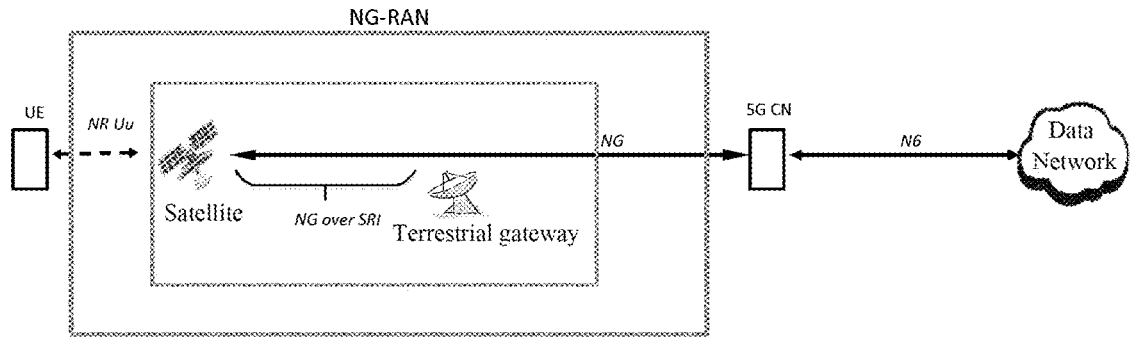
FIG. 2 is a schematic diagram of a regenerative payload satellite network architecture provided by an embodiment of the present application.

Exemplary, FIG. 2 is a schematic diagram of a regenerative payload satellite network architecture, which includes a UE, an NG-RAN, a 5G CN and a data network, where the NG-RAN includes a satellite and a terrestrial gateway. The UE and the satellite are connected through an NR Uu interface, the satellite and the 5G CN are connected through an NG interface, and the 5G core network and the data network are connected through an N6 interface. The satellite and the terrestrial gateway are connected through an NG interface (i.e., NG over SRI) running on a satellite radio interface (SRI). When the UE performs data transmission, the data will be forwarded by the satellite, and the satellite will perform protocol stack processing on the data during the forwarding, so as to achieve regenerative forwarding.

Figure 3:
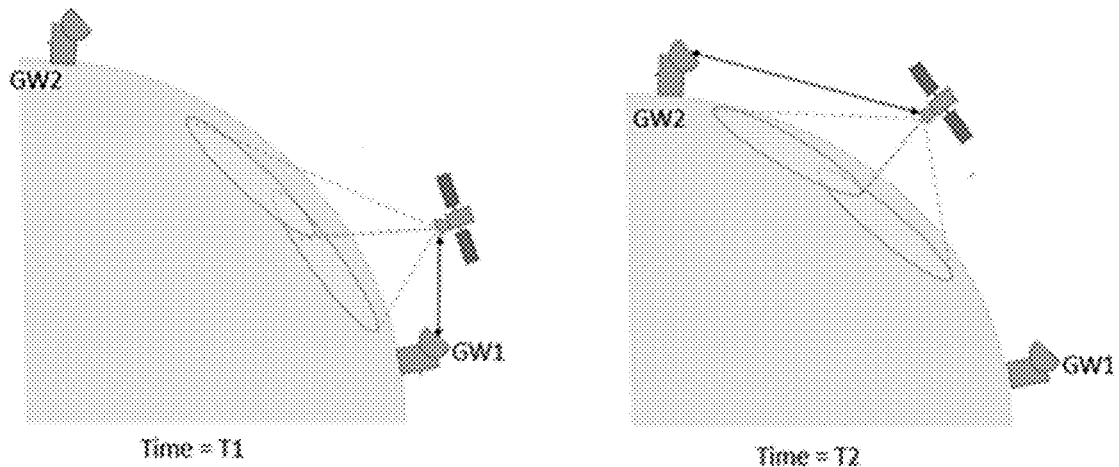
FIG. 3 is a schematic diagram of feeder link switch provided by an embodiment of the present application.

A radio link between the satellite and the terrestrial gateway is usually called a feeder link. When the satellite moves, feeder link switch may occur for the feeder link between the satellite and the terrestrial gateway. A schematic diagram of feeder link switch is as shown in FIG. 3. At time T1, a satellite is connected to a terrestrial gateway GW1. After the satellite moves, at time T2, the satellite is connected to a terrestrial gateway GW2.

If two terrestrial gateways are connected to two terrestrial gNBs (complete gNBs or central units (CUs)) or two cells under one gNB, then all UEs within an area covered by the satellite need to switch from an original cell to a new cell after the feeder link switch. For a case that two terrestrial gateways are connected to the same cell under the same gNB, the UEs may not perform cell switch.

At present, there are two solutions for feeder link switch discussed in the standard. One is hard switch, that is, a satellite breaks a connection with an old terrestrial gateway before making a connection with a new terrestrial gateway, i.e., break-before-make. The other is soft switch, that is, a satellite first establishes a connection with a new terrestrial gateway while maintaining a connection with an old terrestrial gateway, and then breaks the connection with the old terrestrial gateway, i.e., make-before-break.

In an NTN network, if hard feeder link switch is performed between two terrestrial gateways during movement of a satellite, the satellite may not be connected to any terrestrial gateway for a period of time during the hard switch. Within this period of time, a radio link between a base station and a terminal device is interrupted. The base station cannot send a downlink signal or receive an uplink signal. But the terminal device cannot know. Therefore, the terminal device will still perform invalid behaviors such as measurement related to the radio link and uplink transmission, which increases power consumption of the terminal device.

In order to solve the above problems, embodiments of the present application provides a method for controlling a terminal device, a terminal device and a network device, which can indicate to the terminal device that a radio link between the terminal device and the network device is in an interrupted state, so that the terminal device can perform a first operation to avoid that the terminal device performs measurement related to the radio link or performs an uplink transmission behavior, thereby reducing power consumption of the terminal device.

The method for controlling a terminal device provided by the embodiments of the present application may be applied to the transparent payload satellite network architecture as shown in FIG. 1. The gNB can indicate to the UE that the radio link between the gNB and the UE is in an interrupted state, so that the UE can perform a first operation to avoid that the UE performs measurement related to the radio link or performs an uplink transmission behavior, thereby reducing power consumption of the UE.

The terminal device in the embodiments of the present application may be called a user equipment (UE), an access terminal, a user unit, a user station, a mobile radio station, a mobile station, a remote station, a remote terminal, a mobile device, a user terminal, a terminal, a wireless communication device, a user agent or a user apparatus, etc.

The terminal device may be a station (ST) in a WLAN, a cellular phone, a cordless phone, a session initiation protocol (SIP) phone, a wireless local loop (WLL) station, a personal digital assistant (PDA) device, a handheld device with a wireless communication function, a computing device with a wireless communication function, other processing devices connected to a wireless modem, a vehicle-mounted device, a wearable device, a terminal device in a next-generation communication system such as NR network, or a terminal device in a future-evolved public land mobile network (PLMN), etc.

In the embodiments of the present application, the terminal device may be deployed on land, including indoor or outdoor, handheld, wearable or vehicle-mounted devices; may also be deployed on the water (such as a ship, etc.); and may also be deployed in the air (such as on an aircraft, a balloon, a satellite, etc.).

In the embodiments of the present application, the terminal device may be a mobile phone, a tablet computer (Pad), a computer with a wireless transceiving function, a virtual reality (VR) terminal device, an augmented reality (AR) terminal device, a wireless terminal device in industrial control, a wireless terminal device in self driving, a remote medical wireless terminal device, a wireless terminal device in smart grid, a wireless terminal device in transportation safety, a wireless terminal device in smart city or a wireless terminal device in smart home, etc.

As an example rather than a limitation, in the embodiments of the present application, the terminal device may also be a wearable device. The wearable device may also be called a wearable smart device, which is a general name of wearable devices that are developed by performing intelligent design on daily wear using wearable technology, such as glasses, gloves, watches, clothing and shoes. The wearable device is a portable device that is worn directly on a body or integrated into a user's clothing or accessories. The wearable device is not only a hardware device, but also realizes powerful functions through software support, data interaction and cloud interaction. In a broad sense, wearable smart devices include those full-featured and large-sized with complete or partial functions being achieved without relying on smart phones, such as smart watches or smart glasses, and those focusing on only a certain type of application functions and required to be used in cooperation with other devices such as smart phones, such as various kinds of smart bracelets and smart jewelry for physical sign monitoring.

The network device may be an access network device. The access network device may be an evolutional base station (evolutional node B, eNB or e-NodeB), a macro base station, a micro base station (also known as "small base station"), a pico base station, an access point (AP), a transmission point (TP), a new generation base station (new generation Node B, gNodeB) in a long-term evolution (LTE) system, a next-generation (mobile communication system) system, or an authorized auxiliary access long-term evolution (LAA-LTE) system, etc.

In the embodiments of the present application, the network device may be a device used to communicate with a mobile device. The network device may be an access point (AP) in WLAN, a base transceiver station (BTS) in global system of mobile communication (GSM) or code division multiple access (CDMA), a base station (NodeB, NB) in wideband code division multiple access (WCDMA), an evolutional base station (Evolutional Node B, eNB or eNodeB) in LTE, a relay station or access point, a vehicle-mounted device, a wearable device, a network device (gNB)

in an NR network, a network device in a future-evolved PLMN, or a network device in an NTN network, etc.

In the embodiments of the present application, the network device provides services yifor a cell, and the terminal device communicates with the network device through transmission resources (e.g., frequency domain resources, or spectrum resources) used by the cell. The cell may be a cell corresponding to the network device (e.g., a base station), and the cell may belong to a macro base station or a base station corresponding to a small cell. The small cell here may include: a metro cell, a micro cell, a pico cell, a femto cell, etc. These small cells have characteristics of small coverage and low transmit power, and are suitable for providing high-speed data transmission services.

The technical solutions of the embodiments of the present application can be applied to various communication systems, such as a global system of mobile communication (GSM), a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolved system of NR system, an LTE-based access to unlicensed spectrum (LTE-U) system, an NR-based access to unlicensed spectrum (NR-U) system, a non-terrestrial network (NTN) system, a universal mobile telecommunications system (UMTS), a wireless local area network (WLAN), wireless fidelity (WiFi), a 5th-generation communication (5G) system or other communication systems.

The communication system in the embodiments of the present application can be applied to a carrier aggregation (CA) scenario, a dual connectivity (DC) scenario, a standalone (SA) network deployment scenario, etc.

In an implementation, the communication system in the embodiments of the present application may be applied to an unlicensed spectrum, and the unlicensed spectrum may also be considered as a shared spectrum; or, the communication system in the embodiments of the present application may also be applied to a licensed spectrum, and the licensed spectrum may also be considered as a non-shared spectrum.

In an implementation, the embodiments of the present application may be applied to a non-terrestrial network (NTN) system, and may also be applied to a terrestrial network (TN) system.

It should be understood that the terms "system" and "network" are often used interchangeably herein. The term "and/or" herein is only an association relationship for describing associated objects, which means that there can be three kinds of relationships. For example, "A and/or B" can mean that there are three situations: A exists alone, A and B exist at the same time, and B exists alone. In addition, the character "/" herein generally means that associated objects before and after the character are in an "or" relationship.

It should be understood that the "indication" mentioned in the embodiments of the present application can be a direct indication, an indirect indication, or represent having an association relationship. For example, "A indicates B" can mean that A indicates B directly, for example, B can be obtained through A; can also mean that A indicates B indirectly, for example, A indicates C, and B can be obtained through C; and can also mean that there is an association relationship between A and B.

In the description of the embodiments of the present application, the term "corresponding" can mean that there is a direct or indirect correspondence between the two, or an association relationship between the two, or a relationship of indicating and being indicated, of configuring and being configured, or the like.

In an implementation, indication information in the embodiments of the present application includes a physical layer signaling, such as at least one of downlink control information (DCI), a radio resource control (RRC) signaling, and a media access control control element (Media Access Control Control Element, MAC CE).

In an implementation, a higher-level parameter or higher-level signaling in the embodiments of the present application includes at least one of a radio resource control (RRC) signaling and a media access control control element (Media Access Control Control Element, MAC CE).

The technical solutions of the present application are further described in a form of embodiments.

Embodiment 1

Figure 4:
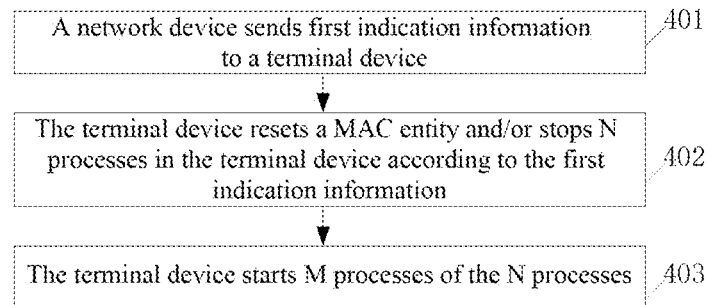
FIG. 4 is a schematic diagram of a method for controlling a terminal device provided by an embodiment of the present application.

As shown in FIG. 4, an embodiment of the present application provides a method for controlling a terminal device, and the method includes the following steps.

401: a network device sends first indication information to a terminal device.

Accordingly, the terminal device receives the first indication information sent by the network device.

The first indication information is used to indicate that a radio link between the terminal device and the network device is in an interrupted state.

After the radio link between the terminal device and the network device is interrupted, the radio link between the terminal device and the network device is in the interrupted state.

The radio link between the terminal device and the network device being in the interrupted state means that there is no communication connection between the terminal device and the network device. For example, from the time when a feeder link between a satellite and a terrestrial gateway is interrupted, the radio link between the terminal device and the network device is in the interrupted state before a feeder link between the satellite and another terrestrial gateway is connected.

The radio link between the terminal device and the network device being in a connected state means that there is a communication connection between the terminal device and the network device. For example, after a feeder link between a satellite and a terrestrial gateway is connected, the radio link between the terminal device and the network device is in the connected state.

In an implementation, an interruption of the radio link between the terminal device and the network device may be caused by feeder link switch. In the embodiment of the present application, that the radio link between the terminal device and the network device is in the interrupted state may also be caused by other reasons, which is not limited in the embodiment of the present application.

For feeder link switch of a satellite between two terrestrial gateways in the same cell, and for feeder link switch of a satellite between two terrestrial gateways in different cells, the method for controlling a terminal device provided by the embodiment of the present application can be applied to the interruption of the radio link interruption between the terminal device and the network device caused by these two cases.

In an implementation, if the interruption of the radio link between the terminal device and the network device is caused by the feeder link switch, the first indication information may be feeder link switch indication information.

In an implementation, the network device may send second indication information to the terminal device, and accordingly, the terminal device may receive the second indication information. The second indication information is used to indicate resetting a MAC entity, and/or indicate stopping N processes in the terminal device.

The terminal device resets the MAC entity and/or stops the N processes in the terminal device, which may include the following two possible implementations.

A first possible implementation is: after the terminal device receives the first indication information, the terminal device may spontaneously determine to reset the MAC entity and/or stop the N processes in the terminal device.

A second possible implementation is: after receiving the first indication information, the terminal device determines to reset the MAC entity and/or stop the N processes in the terminal device further according to an instruction of the second indication information.

In an implementation, the network device may also send third indication information to the terminal device, and accordingly, the terminal device may receive the third indication information sent by the network device. The third indication information is used to indicate starting M processes of the N processes.

After the terminal device stops the N processes in the terminal device, the starting of the M processes of the N processes may also include the following two possible implementations.

A first possible implementation is: after the terminal device stops the N processes in the terminal device, the terminal device may spontaneously start the M processes of the N processes.

A second possible implementation is: after the terminal device stops the N processes in the terminal device, the terminal device may start the M processes of the N processes according to an instruction of the third indication information.

402: The terminal device resets the MAC entity and/or stops the N processes in the terminal device according to the first indication information.

N is an integer greater than or equal to 1.

In an implementation, the resetting of the MAC entity includes at least one of the following:
1. clearing a Bj value of each logical channel to zero; where the Bj value may be an assembly parameter of MAC assembly for logical channel j;
2. stopping all running timers, or stop partial running timers;
3. considering that all time alignment timers time out, or considering that some time alignment timers time out;
4. setting new data indication NDI values of all uplink hybrid automatic repeat request HARQ processes to zero;
5. stopping all ongoing random access processes;
6. deleting explicitly-configured contention-free random access resources;
7. clearing a Msg3 buffer;
8. canceling a triggered scheduling request SR process;
9. canceling a triggered buffer status reporting (BSR) process;
10. canceling a triggered power headroom reporting (PHR) process;
11. clearing caches of all downlink HARQ processes;
12. for each downlink HARQ process, taking a next received downlink TB transmission as an initial transmission;
13. releasing a temporary cell-radio network temporary identifier (TC-RNTI);
14. resetting a beam failure indication counter (BFI_COUNTER).

It should be noted that a resetting operation different from the above 14 operations of resetting the MAC entity may also be performed to reset the MAC entity, which is not limited by the embodiment of the present application.

In a case that the radio link between the terminal device and the network device is in the interrupted state, executing the resetting of the MAC entity can avoid some MAC processes being triggered when the radio link is in the interrupted state, so that the terminal device can avoid unnecessary sending and receiving operations.

In an implementation, the N processes include at least one of the following.

1. Stopping a channel sounding reference signal (SRS) transmission.

Stopping the SRS transmission can save power consumption of the terminal device on the one hand, and reduce uplink interference on the other hand. Since a timing advance (TA) of the terminal device will change when the radio link between the terminal device and the network device is in the interrupted state, sending the SRS with an old TA will cause additional uplink interference.

2. Stopping executing a beam measurement and/or a cell measurement.

In the embodiment of the present application, the beam measurement and/or the cell measurement includes at least one of the following:
an RRM measurement, an RLM measurement and a beam failure detection.

That is, stopping executing the beam measurement and/or the cell measurement includes:
2.1 stopping executing the radio resource management (RRM) measurement;
2.2 stopping executing the radio link monitoring (RLM) measurement;
2.3 stopping executing the beam failure detection.

In an implementation, in the embodiment of the present application, the terminal device may also stop other measurement processes other than the above three measurement processes, which is not limited in the embodiment of the present application.

3. Stopping reporting a result of the beam measurement and/or the cell measurement.

3.1 Stopping reporting a result of the RRM measurement.

In an implementation, in the embodiment of the present application, the terminal device may also stop reporting other contents other than results of the above three measurements to the network device, which is not limited in the embodiment of the present application.

In an implementation, stopping reporting the result of the beam measurement and/or the cell measurement may be implemented by stopping a timer that is used to trigger periodic reporting of a measurement result (i.e., the result of the beam measurement and/or the cell measurement).

When the radio link between the terminal device and the network device is in the interrupted state, if the measurement process related to the terminal device continues, it will result in that the terminal device determines that a current radio link fails or a measurement switch event is triggered, which will cause the terminal device to trigger an RRC reestablishment process, or after triggering measurement reporting, the network device cannot receive reported information. Thus, stopping the beam measurement and/or the cell measurement and stopping reporting the result of the beam measurement and/or the cell measurement can avoid performing an invalid measurement behavior and an invalid reporting behavior by the terminal device, and avoid triggering the RRC reestablishment process.

4. Stopping a random access attempt.

In the embodiment of the present application, stopping the random access attempt means stopping a current (ongoing but not successful yet) random access attempt.

The above random access process may be triggered by any event or a specific event, such as random access triggered by a scheduling request (SR) before feeder link switch.

Since the terminal device cannot get an uplink resource response, the random access attempt can be stopped to avoid an invalid random access attempt.

5. Stopping a radio link monitoring timer.

In the embodiment of the present application, the radio link monitoring timer may refer to a T310 timer, which can be used to time waiting time for monitoring a radio link failure.

Stopping the radio link monitoring timer can prevent the radio link monitoring timer from timing out during the radio link between the terminal device and the network device is in the interrupted state, thereby avoiding triggering the RRC reestablishment process.

In the embodiment of the present application, the network device can indicate to the terminal device that the radio link between the terminal device and the network device is in the interrupted state, so that the terminal device can reset the MAC entity and/or stop the N processes in the terminal device. In this way, it is avoided that the terminal device performs uplink transmission related to a MAC layer and retransmission, and some invalid behaviors of the terminal device (for example, a measurement process, a reporting process of a measurement result, a random access attempt, and a process of SRS transmission, etc.) are avoided, thereby reducing the power consumption of the terminal device.

In an implementation, in the embodiment of the present application, there may be multiple execution opportunities for the terminal device to reset the MAC entity and/or stop the N processes in the terminal device, which may specifically include multiple possible cases.

Case 1: resetting the MAC entity and/or stopping the N processes in the terminal device immediately after receiving the first indication information.

Case 2: resetting the MAC entity and/or stopping the N processes in the terminal device after receiving the first indication information, with an interval of a first preset duration between the time of receiving the first indication information and the time of the resetting or stopping.

The first preset duration may be pre-specified in a protocol or determined by the terminal device itself.

Case 3: after receiving the first indication information, resetting the MAC entity and/or stopping the N processes in the terminal device according to first time information indicated by the network device.

In the embodiment of the present application, the network device can send time indication information to the terminal device to indicate the first time information of the radio link being in the interrupted state, and correspondingly, the terminal device can also receive the time indication information sent by the network device.

In an implementation, the first time information includes at least one of the following:
 (1) a starting time of the radio link being in the interrupted state;
 (2) a time after the radio link is interrupted and within a duration of the interrupted state;
 (3) a duration of the radio link being in the interrupted state;
 (4) an ending time of the radio link being in the interrupted state.

In an implementation, in the above case 3, a first target time can be determined first according to the first time information, and then the MAC entity can be reset and/or the N processes in the terminal device can be stopped at the first target time.

The first target time includes one of the following: the starting time of the radio link being in the interrupted state, the time after the radio link is interrupted and within the duration of the interrupted state.

That is, when the first time information includes the above (1) or (2), the MAC entity can be reset and/or the N processes in the terminal device can be stopped directly according to the time indicated in (1) or (2).

When the first time information does not include (1) and (2) but includes (3), in the case that the terminal device knows the duration of the radio link being in the interrupted state, the terminal device can select any time within the duration from a current time of receiving the first indication information to reset the MAC entity and/or stop the N processes in the terminal device.

When the first time information does not include (1) and (2) but includes (4), in the case that the ending time of the radio link being in the interrupted state is known, any time from the current time of receiving the first indication information and before the ending time can be selected to reset the MAC entity and/or stop the N processes in the terminal device.

403: the terminal device starts M processes of the N processes.

M is an integer greater than or equal to 1, and M is less than or equal to N.

The M processes may include at least one of the following:
 starting the SRS transmission, starting the beam measurement and/or the cell measurement, starting to report the result of the beam measurement and/or the cell measurement.

The starting of the M processes of the N processes may include the following possible cases:
 (a) if the N processes include stopping the SRS transmission, then starting the M processes of the N processes includes starting the SRS transmission;
 (b) if the N processes include stopping executing the beam measurement and/or the cell measurement, then starting the M processes of the N processes includes starting the beam measurement and/or the cell measurement;
 (c) if the N processes include stopping reporting the result of the beam measurement and/or the cell measurement, then starting the M processes of the N processes includes starting to report the result of the beam measurement and/or the cell measurement.

In the embodiment of the present application, after stopping the N processes in the terminal device, the M processes of the N processes can also be started, so that the M processes can be carried out normally after the radio link is switched from the interrupted state to the connected state, thus ensuring normal measurement, measurement result reporting, random access attempt, SRS sending and so on after the radio link between the terminal device and the network device is in the connected state, and ensuring normal communication between the terminal device and the network device.

In an implementation, in the embodiment of the present application, there may be multiple execution opportunities for the terminal device to start the M processes of the N processes, which may specifically include multiple possible cases.

Case a: starting the M processes of the N processes after the terminal device stops the N processes in the terminal device, with an interval of a second preset duration between the time of stopping the N processes and the time of the starting.

The second preset duration may be pre-specified in a protocol or determined by the terminal device itself.

Case b: starting the M processes of the N processes according to the time indication information sent by the network device.

The network device can also send the time indication information to the terminal device, and correspondingly, the terminal device can also receive the time indication information sent by the network device.

The time indication information may include the first time information of the radio link being in the interrupted state, and/or second time information of the radio link being in a connected state.

In an implementation, the second time information includes at least one of the following:

(5) a starting time of the radio link being in the connected state;

(6) a time after the radio link is connected and within a duration of the connected state.

It should be noted that in the embodiment of the present application, the first time information and the second time information may be indicated by one piece of indication information or by different pieces of indication information respectively, which is not limited in the embodiment of the present application.

In an implementation, in the above case b, a second target time can be determined first according to the first time information and/or the second time information, and then the M processes of the N processes can be started at the second target time.

The second target time includes one of the following: the ending time of the radio link being in the interrupted state, the starting time of the radio link being in the interrupted state, the time after the radio link is interrupted and within the duration of the interrupted state.

That is, when the time indication information includes the above (4), (5) or (6), the M processes of the N processes can be started directly according to the time indicated in (4), (5) or (6).

When the time indication information does not include the above (4), (5) and (6) but includes the above (1), the terminal device can start the M processes of the N processes after the starting time of the radio link being in the interrupted state, with an interval of a third preset duration between the starting time of the radio link being in the interrupted state and the time of starting the M processes of the N processes.

The third preset duration may be pre-specified in a protocol or determined by the terminal device itself.

When the time indication information does not include the above (4), (5) and (6) but includes the above (2), the terminal device can start the M processes of the N processes after the time after the radio link is interrupted and within the duration of the interruption state, with an interval of a fourth preset duration between the time after the radio link is interrupted and within the duration of the interruption state and the time of the starting.

The fourth preset duration may be pre-specified in a protocol or determined by the terminal device itself.

When the time indication information does not include the above (4), (5) and (6) but includes the above (3), the terminal device can start the M processes of the N processes after receiving the first indication information, with an interval of the duration of the radio link being in the interrupted state between the time of receiving the first indication information and the time of the starting; or the terminal device can start the M processes of the N processes after stopping the N processes, with an interval of the duration of the radio link being in the interrupted state between the time of stopping the N processes and the time of the starting.

In the embodiment of the present application, the network device can send the first indication information, the second indication information, the third indication information and the time indication information to the terminal device through separate messages, or send multiple pieces of indication information in the first indication information, the second indication information, the third indication information and the time indication information to the terminal device through the same message, which is not specifically limited in the embodiment of the present application.

Embodiment 2

A terminal device performs a resetting operation on a MAC entity and/or stops an SRS transmission according to first indication information (which may be feeder link switch indication information) sent by a network device.

Further, the terminal device can also start the SRS transmission after stopping the SRS transmission.

A specific implementation process is as follows.

In an NTN cell, the terminal device in the connected state receives the feeder link switch indication information sent by the network device, performs the resetting operation on the MAC entity and/or stops the SRS transmission according to the indication information, and starts the SRS transmission after the SRS transmission is stopped.

A first optional implementation is: the feeder link switch indication information may indicate one piece of time information, for example, t2 (a time when feeder link switch is completed, which is equivalent to the ending time of the radio link being in the interrupted state as described in the above (4), or the starting time of the radio link being in the connected state as described in the above (5)). After receiving the feeder link switch indication information, the terminal device may perform the resetting operation on a MAC entity of a current serving cell and/or stop the SRS transmission immediately, and start the SRS transmission at time t2.

Figure 5:
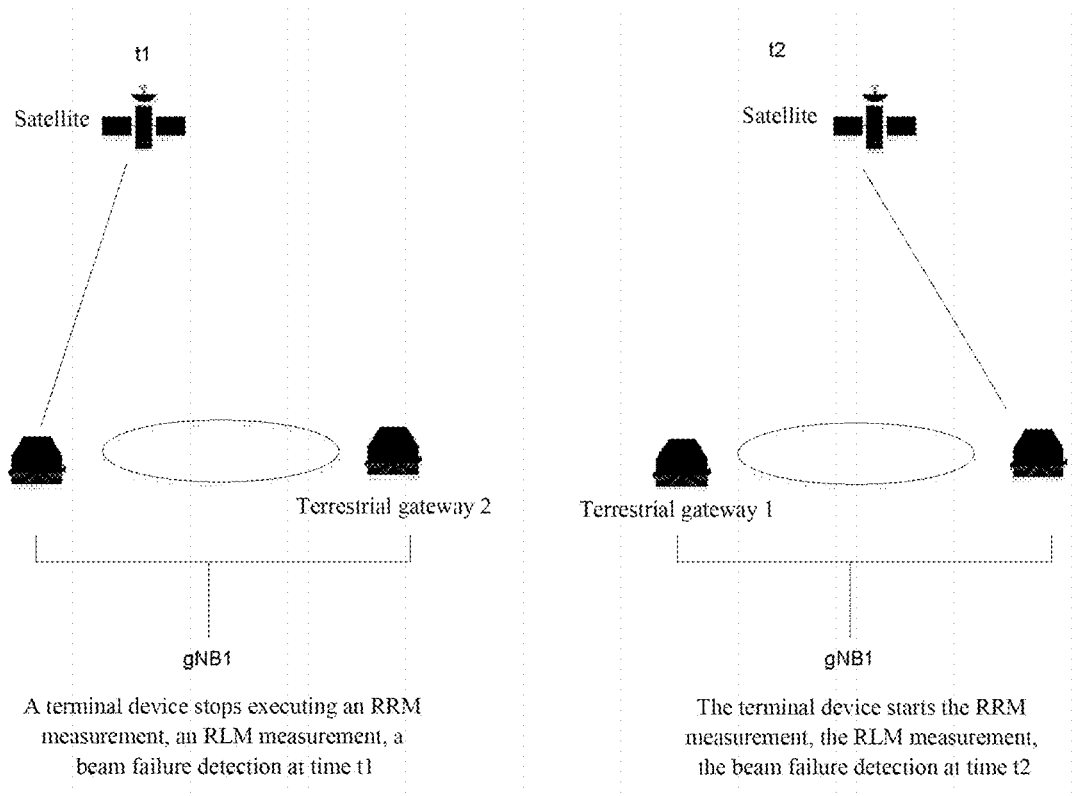
FIG. 5 is an application scenario diagram corresponding to Embodiment 2 provided by an embodiment of the present application.

A second optional implementation is: the feeder link switch indication information may indicate two pieces of time information, for example, t1 (a starting time of the feeder link switch, which is equivalent to the starting time of the radio link being in the interrupted state as described in the above (1)) and t2 (the time when the feeder link switching is completed). After receiving the feeder link switch indication information, the terminal device may perform the resetting operation on the MAC entity of the current serving cell and/or stop the SRS transmission at time t1, and start the SRS transmission at time t2. A schematic diagram of an application scenario corresponding to the second optional implementation is as shown in FIG. 5, in which a satellite performs feeder link switch from time t1 to time t2. Before time t1, the satellite is connected to a terrestrial gateway 1, and after time t2, the satellite is connected to a terrestrial gateway 2. The terrestrial gateway 1 and the terrestrial gateway 2 are connected to a same base station (gNB).

In an implementation, the feeder link switch indication information may include time information t1 and a duration delta-t, where delta-t=t2−t1.

In the embodiment of the present application, in the NTN cell, the terminal device in the connected state can receive the feeder link switch indication information sent by the network device, and perform the resetting operation on the MAC entity and/or stop the SRS transmission according to the indication information, which can avoid uplink transmission of the MAC layer and retransmission and can avoid invalid SRS transmission, thereby saving the power consumption of the terminal device. Further, starting the SRS transmission after stopping the SRS transmission may refer to starting the SRS transmission after the feeder link switch is completed.

Embodiment 3

A terminal device stops executing an RRM measurement, an RLM measurement, a beam failure detection and so on according to first indication information (which may be feeder link switch indication information) sent by a network device.

Further, the terminal device starts the RRM measurement, the RLM measurement, the beam failure detection and so on after stopping executing the RRM measurement, the RLM measurement and the beam failure detection.

A specific implementation process is as follows.

In an NTN cell, the terminal device in the connected state receives the feeder link switch indication information sent by the network device, stops executing the RRM measurement, the RLM measurement, the beam failure detection and so on according to the indication information, and starts the RRM measurement, the RLM measurement and the beam failure detection after stopping executing the RRM measurement, the RLM measurement and the beam failure detection.

A first optional implementation is: the feeder link switch indication information may indicate one piece of time information, for example, t2 (a time when feeder link switch is completed, which is equivalent to the ending time of the radio link being in the interrupted state as described in the above (4), or the starting time of the radio link being in the connected state as described in the above (5)). After receiving the feeder link switch indication information, the terminal device may stop executing the RRM measurement, the RLM measurement, the beam failure detection and so on immediately, and start the RRM measurement, the RLM measurement, the beam failure detection and so on at time t2.

Figure 6:
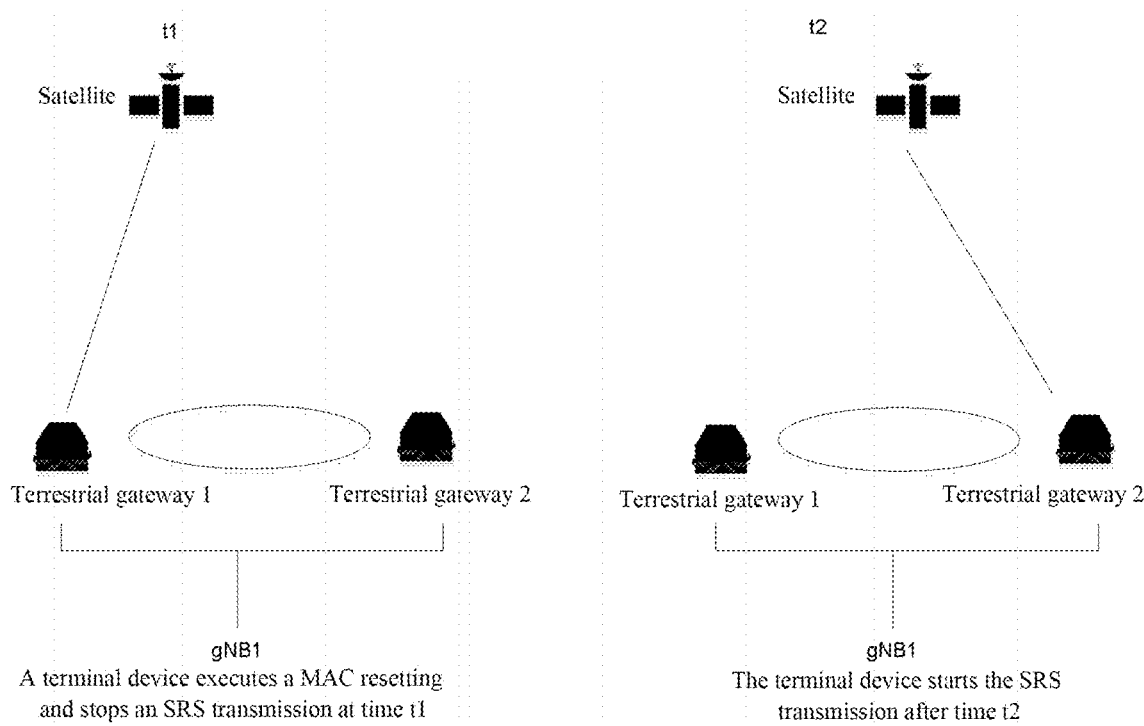
FIG. 6 is an application scenario diagram corresponding to Embodiment 3 provided by an embodiment of the present application.

A second optional implementation is: the feeder link switch indication information may indicate two pieces of time information, for example, t1 (a starting time of the feeder link switch, which is equivalent to the starting time of the radio link being in the interrupted state as described in the above (1)) and t2 (the time when the feeder link switching is completed). After receiving the feeder link switch indication information, the terminal device stops executing the RRM measurement, the RLM measurement, the beam failure detection and so on at time t1, and starts the RRM measurement, the RLM measurement, the beam failure detection and so on at time t2. A schematic diagram of an application scenario corresponding to the second optional implementation is as shown in FIG. 6, in which a satellite performs feeder link switch from time t1 to time t2. Before time t1, the satellite is connected to a terrestrial gateway 1, and after time t2, the satellite is connected to a terrestrial gateway 2. The terrestrial gateway 1 and the terrestrial gateway 2 are connected to a same base station (gNB).

In an implementation, when stopping executing the RRM measurement, measurement reporting may also be stopped, and a running periodic timer for triggering periodic reporting may be stopped (to prevent triggering the periodic reporting during the feeder link switch).

When stopping executing the RRM measurement, a running T310 timer is stopped at the same time (to prevent T310 from timing out during the feeder link switch and then triggering RRC reestablishment).

Embodiment 4

A terminal device stops an ongoing current random access (RA) attempt according to first indication information (which may be feeder link switch indication information) sent by a network device.

Further, after stopping the ongoing current RA attempt, the terminal device can restart the RA attempt after feeder link switch is completed.

A specific implementation process is as follows.

In an NTN cell, the terminal device in the connected state receives the feeder link switch indication information sent by the network device, stops the ongoing current RA attempt according to the indication information, and reattempts the RA after the feeder link switch is completed.

A first optional implementation is: the feeder link switch indication information may indicate one piece of time information, for example, t2 (a time when the feeder link switch is completed, which is equivalent to the ending time of the radio link being in the interrupted state as described in the above (4), or the starting time of the radio link being in the connected state as described in the above (5)). After receiving the feeder link switch indication information, the terminal device may stop the ongoing current RA attempt immediately, and reattempt the random access at time t2.

Figure 7:
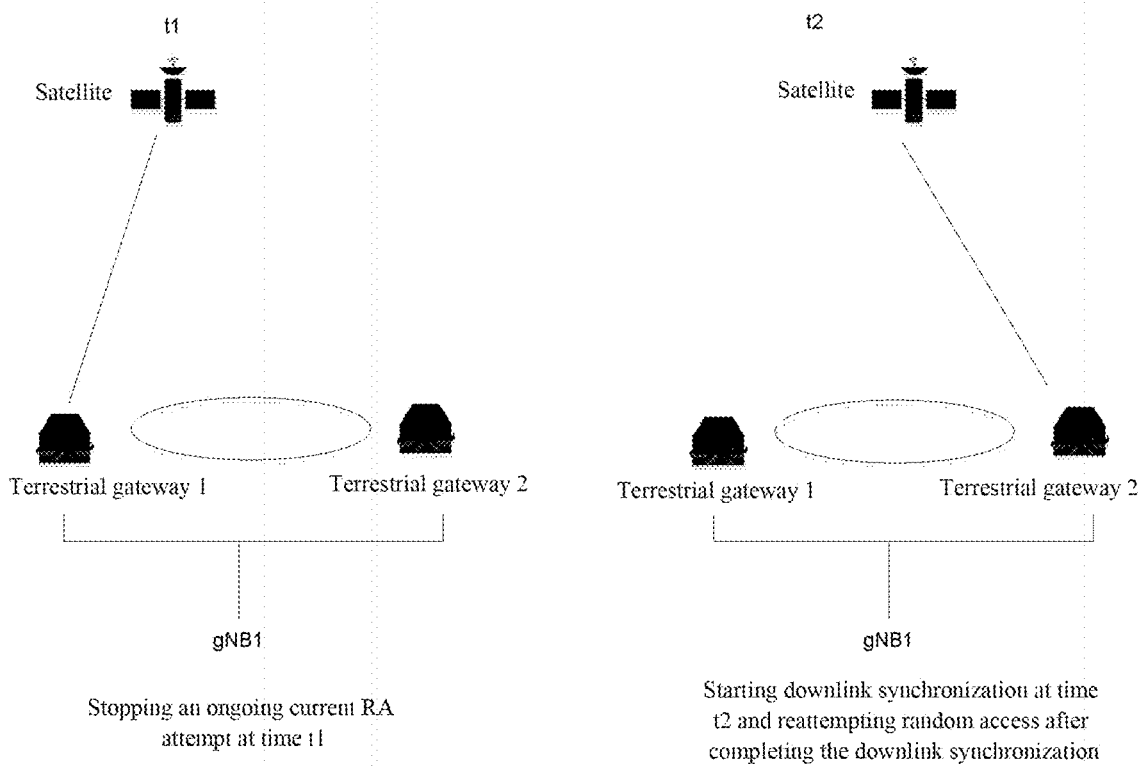
FIG. 7 is an application scenario diagram corresponding to Embodiment 4 provided by an embodiment of the present application.

A second optional implementation is: the feeder link switch indication information may indicate two pieces of time information, for example, t1 (a starting time of the feeder link switch, which is equivalent to the starting time of the radio link being in the interrupted state as described in the above (1)) and t2 (the time when the feeder link switching is completed). After receiving the feeder link switch indication information, the terminal device stops the ongoing current RA attempt at time t1, and reattempts the random access at time t2 (which may be performed after downlink synchronization is completed). A schematic diagram of an application scenario corresponding to the second optional implementation is as shown in FIG. 7, in which a satellite performs feeder link switch from time t1 to time t2. Before time t1, the satellite is connected to a terrestrial gateway 1, and after time t2, the satellite is connected to a terrestrial gateway 2. The terrestrial gateway 1 and the terrestrial gateway 2 are connected to a same base station (gNB).

In an implementation, the above random access process may be triggered by any event or a specific event, such as an SR. A random access terminal with a triggered SR before the feeder link switch does not get an uplink resource response, and a demand for the SR is still there after the feeder link switch indication information, and thus reattempting the RA may continue to request uplink resources.

Figure 8:
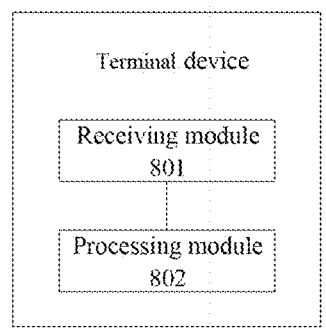
FIG. 8 is a schematic structural diagram of a terminal device provided by an embodiment of the present application.

As shown in FIG. 8, an embodiment of the present application provides a terminal device, including: a receiving module 801, configured to receive first indication information sent by a network device, where the first indication information is used to indicate that a radio link between the terminal device and the network device is in an interrupted state;

a processing module 802, configured to reset a MAC entity and/or stop N processes in the terminal device according to the first indication information, where N is an integer greater than or equal to 1.

In an implementation, the processing module 802 is further configured to start M processes of the N processes after stopping the N processes in the terminal device, where M is an integer greater than or equal to 1, and M is less than or equal to N.

In an implementation, the receiving module 801 is further configured to receive time indication information sent by the network device, where the time indication information includes first time information of the radio link being in the interrupted state and/or second time information of the radio link being in a connected state.

In an implementation, the first time information includes at least one of the following:
a starting time of the radio link being in the interrupted state, a time after the radio link is interrupted and within a duration of the interrupted state, a duration of the radio link being in the interrupted state, an ending time of the radio link being in the interrupted state.

In an implementation, the second time information includes at least one of the following:
a starting time of the radio link being in the connected state, a time after the radio link is connected and within a duration of the connected state.

In an implementation, the processing module 802 is specifically configured to reset the MAC entity and/or stop the N processes in the terminal device according to the first indication information and the first time information.

In an implementation, the processing module 802 is specifically configured to start the M processes of the N processes according to the first time information and/or the second time information.

In an implementation, the processing module 802 is specifically configured to determine a first target time according to the first time information;
reset the MAC entity and/or stop the N processes in the terminal device at the first target time according to the first indication information;
where the first target time includes one of the following: a starting time of the radio link being in the interrupted state, a time after the radio link is interrupted and within a duration of the interrupted state.

In an implementation, the processing module 802 is specifically configured to determine a second target time according to the first time information and/or the second time information;
start the M processes of the N processes at the second target time;
where the second target time includes one of the following: an ending time of the radio link being in the interrupted state, a starting time of the radio link being in the interrupted state, a time after the radio link is interrupted and within a duration of the interrupted state.

In an implementation, the N processes include at least one of the following:
stopping a channel sounding reference signal SRS transmission, stopping executing a beam measurement and/or a cell measurement, stopping reporting a result of the beam measurement and/or the cell measurement, stopping a random access attempt, stopping a radio link monitoring timer.

In an implementation, if the N processes include stopping the SRS transmission, then starting the M processes of the N processes includes starting the SRS transmission.

In an implementation, if the N processes include stopping executing the beam measurement and/or the cell measurement, then starting the M processes of the N processes includes starting the beam measurement and/or the cell measurement.

In an implementation, if the N processes include stopping reporting the result of the beam measurement and/or the cell measurement, then starting the M processes of the N processes includes starting to report the result of the beam measurement and/or the cell measurement.

In an implementation, if the N processes include stopping the random access attempt, then starting the M processes of the N processes includes starting the random access attempt.

In an implementation, the beam measurement and/or the cell measurement includes at least one of the following:
an RRM measurement, an RLM measurement and a beam failure detection.

In an implementation, the receiving module 801 is further configured to receive second indication information sent by the network device before the processing module 802 resets the MAC entity and/or stops the N processes in the terminal device according to the first indication information, where the second indication information is used to indicate resetting the MAC entity, and/or indicate stopping the N processes.

In an implementation, the receiving module 801 is further configured to receive third indication information sent by the network device before starting the M processes of the N processes, where the third indication information is used to indicate starting the M processes of the N processes.

An embodiment of the present application further provides a terminal device, including: a memory storing executable program codes;
a processor coupled with the memory;
where the processor calls the executable program codes stored in the memory to execute the method for controlling a terminal device executed by the terminal device in the embodiments of the present application.

Figure 9:
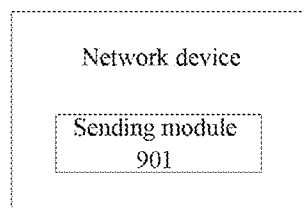
FIG. 9 is a schematic structure diagram of a network device provided by an embodiment of the present application.

As shown in FIG. 9, an embodiment of the present application provides a network device, including:
a sending module 901, configured to send first indication information to a terminal device, where the first indication information is used to indicate that a radio link between the terminal device and the network device is in an interrupted state.

In an implementation, the sending module 901 is further configured to send time indication information to the terminal device, where the time indication information includes first time information of the radio link being in the interrupted state, and/or second time information of the radio link being in a connected state.

In an implementation, the first time information includes at least one of the following:
a starting time of the radio link being in the interrupted state, a time after the radio link is interrupted and within a duration of the interrupted state, a duration of the radio link being in the interrupted state, an ending time of the radio link being in the interrupted state.

In an implementation, the second time information includes at least one of the following:
a starting time of the radio link being in the connected state, a time after the radio link is connected and within a duration of the connected state.

In an implementation, the sending module 901 is further configured to send second indication information to the terminal device, where the second indication information is used to indicate resetting a MAC entity, and/or indicate stopping N processes in the terminal device, where N is an integer greater than or equal to 1.

In an implementation, the sending module 901 is further configured to send third indication information to the terminal device, where the third indication information is used to indicate starting M processes of the N processes, where M is an integer greater than or equal to 1, and M is less than or equal to N.

In an implementation, the N processes include at least one of the following:
stopping a channel sounding reference signal SRS transmission, stopping executing a beam measurement and/or a cell measurement, stopping reporting a result of the beam measurement and/or the cell measurement, stopping a random access attempt, stopping a radio link monitoring timer.

In an implementation, if the N processes include stopping the SRS transmission, then starting the M processes of the N processes includes starting the SRS transmission.

In an implementation, if the N processes include stopping executing the beam measurement and/or the cell measurement, then starting the M processes of the N processes includes starting the beam measurement and/or the cell measurement.

In an implementation, if the N processes include stopping reporting the result of the beam measurement and/or the cell measurement, then starting the M processes of the N processes includes starting to report the result of the beam measurement and/or the cell measurement.

In an implementation, if the N processes include stopping the random access attempt, then starting the M processes of the N processes includes starting the random access attempt.

In an implementation, the beam measurement and/or the cell measurement includes at least one of the following:
an RRM measurement, an RLM measurement and a beam failure detection.

An embodiment of the present application further provides a network device, including: a memory storing executable program codes;
a processor coupled with the memory;
where the processor calls the executable program codes stored in the memory to execute the method for controlling a terminal device executed by the network device in the embodiments of the present application.

Figure 10:
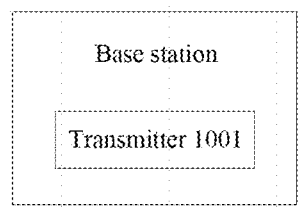
FIG. 10 is a schematic structural diagram of a base station provided by an embodiment of the present application.

Exemplary, as shown in FIG. 10, a network device in an embodiment of the present application may be a base station, including:
a transmitter 1001, configured to send first indication information to a terminal device, where the first indication information is used to indicate that a radio link between the terminal device and the network device is in an interrupted state.

In an implementation, the transmitter 1001 is further configured to send time indication information to the terminal device, where the time indication information includes first time information of the radio link being in the interrupted state, and/or second time information of the radio link being in a connected state.

In an implementation, the first time information includes at least one of the following:
a starting time of the radio link being in the interrupted state, a time after the radio link is interrupted and within a duration of the interrupted state, a duration of the radio link being in the interrupted state, an ending time of the radio link being in the interrupted state.

In an implementation, the second time information includes at least one of the following:
a starting time of the radio link is in the connected state, a time after the radio link is connected and within a duration of the connected state.

In an implementation, the transmitter 1001 is further configured to send second indication information to the terminal device, where the second indication information is used to indicate resetting a MAC entity, and/or indicate stopping N processes in the terminal device, where N is an integer greater than or equal to 1.

In an implementation, the transmitter 1001 is further configured to send third indication information to the terminal device, where the third indication information is used to indicate starting M processes of the N processes, where M is an integer greater than or equal to 1, and M is less than or equal to N.

In an implementation, the N processes include at least one of the following:
stopping a channel sounding reference signal SRS transmission, stopping executing a beam measurement and/or a cell measurement, stopping reporting a result of the beam measurement and/or the cell measurement, stopping a random access attempt, stopping a radio link monitoring timer.

In an implementation, if the N processes include stopping the SRS transmission, then starting the M processes of the N processes includes starting the SRS transmission.

In an implementation, if the N processes include stopping executing the beam measurement and/or the cell measurement, then starting the M processes of the N processes includes starting the beam measurement and/or the cell measurement.

In an implementation, if the N processes include stopping reporting the result of the beam measurement and/or the cell measurement, then starting the M processes of the N processes includes starting to report the result of the beam measurement and/or the cell measurement.

In an implementation, if the N processes include stopping the random access attempt, then starting the M processes of the N processes includes starting the random access attempt.

In an implementation, the beam measurement and/or the cell measurement includes at least one of the following:
an RRM measurement, an RLM measurement and a beam failure detection.

Figure 11:
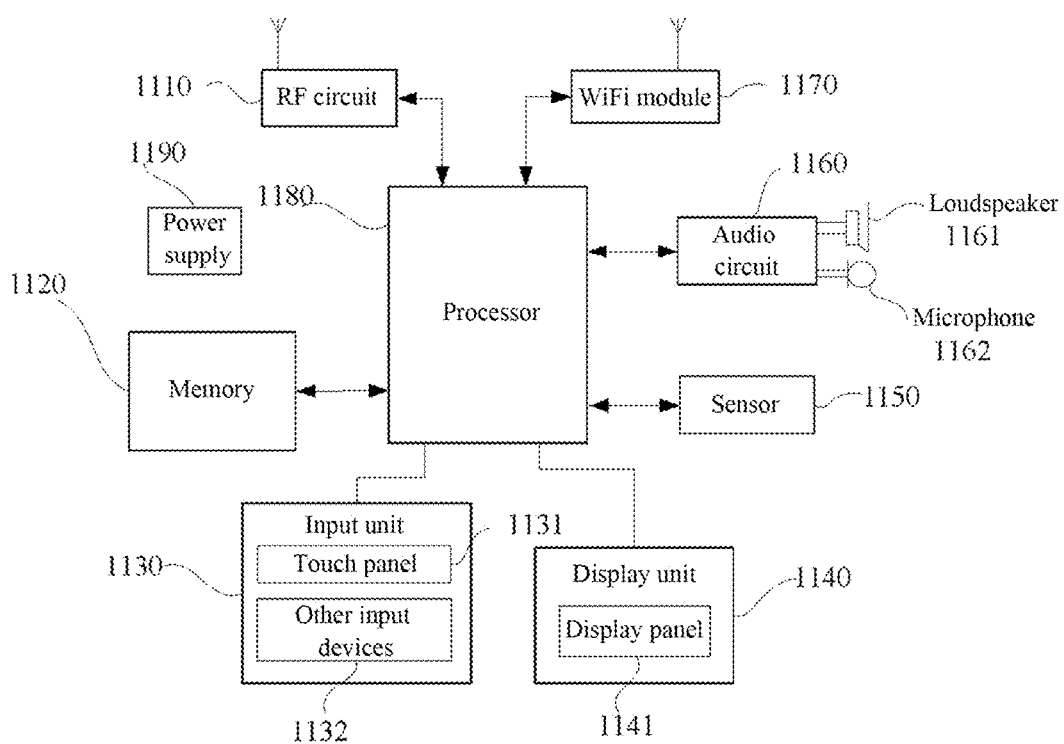
FIG. 11 is a schematic structural diagram of a mobile phone provided by an embodiment of the present application.

Exemplary, the terminal device in the embodiments of the present application may be a mobile phone, as shown in FIG. 11. The mobile phone may include components such as a radio frequency (RF) circuit 1110, a memory 1120, an input unit 1130, a display unit 1140, a sensor 1150, an audio circuit 1160, a wireless fidelity (WiFi) module 1170, a processor

1180 and a power supply 1190. The radio frequency circuit 1110 includes a receiver 1111 and a transmitter 1112. Those skilled in the art can understand that a mobile phone structure shown in FIG. 11 does not constitute a limitation to the mobile phone. More or fewer components than those shown in the figure may be included, or some components may be combined, or there may be a different component arrangement.

The RF circuit 1110 may be used to receive and send information or receive and send signals during a call. In particular, the RF circuit 1110 receives downlink information of the base station and sent the same to the processor 1180 for processing; besides, the RF circuit 1110 sends data involving uplink to the base station. Generally, the RF circuit 1110 includes, but is not limited to, an antenna, at least one amplifier, a transceiver, a coupler, a low noise amplifier (LNA), a duplexer, etc. In addition, the RF circuit 1110 may further communicate with a network and other devices through wireless communication. Any communication standard or protocol may be used for the wireless communication, including but not limited to a global system of mobile communication (GSM), a general packet radio service (GPRS), code division multiple access (CDMA), wideband code division multiple access (WCDMA), long term evolution (LTE), an E-mail, a short messaging service (SMS), etc.

The memory 1120 may be used to store software programs and modules, and the processor 1180 may execute various functional applications and data processing of the mobile phone by running the software programs and the modules stored in the memory 1120. The memory 1120 may mainly include a program storage area and a data storage area, where the program storage area may store an operating system, an application program required for at least one function (such as a sound playing function, an image playing function), etc.; and the data storage area may store data (such as audio data, phonebooks) created according to use of the mobile phone. In addition, the memory 1120 may include a high-speed random access memory, and may also include a non-volatile memory, such as at least one disk storage device, a flash memory device, or other volatile solid-state storage devices.

The input unit 1130 may be used to receive inputted digital or character information and generate signal inputs related to user setting and function control of the mobile phone. Specifically, the input unit 1130 may include a touch panel 1131 and other input devices 1132. The touch panel 1131, also known as a touch screen, may collect a user's touch operation on or near the touch panel 1131 (such as a user's operation on or near the touch panel 1131 with any suitable object or accessory such as a finger, a stylus, etc.), and drive a corresponding connection apparatus according to a preset program. In an implementation, the touch panel 1131 may include two parts, namely, a touch detection apparatus and a touch controller. The touch detection apparatus detects a user's touch orientation, detects a signal brought by a touch operation, and transmits the signal to the touch controller. The touch controller receives touch information from the touch detection apparatus, converts it into contact coordinates, and then sends it to the processor 1180, and the touch controller may receive and execute a command sent by the processor 1180. In addition, the touch panel 1131 may be implemented using multiple types, such as resistive, capacitive, infrared, and surface acoustic wave. In addition to the touch panel 1131, the input unit 1130 may also include other input devices 1132. Specifically, other input devices 1132 may include, but are not limited to, one or more of a physical keyboard, a function key (such as a volume control key, a switch key, etc.), a trackball, a mouse, a joystick, etc.

The display unit 1140 may be used to display information inputted by a user or information provided to the user and various menus of the mobile phone. The display unit 1140 may include a display panel 1141. In an implementation, the display panel 1141 may be configured in a form of a liquid crystal display (LCD), an organic light-emitting diode (OLED), etc. Further, the touch panel 1131 may cover the display panel 1141. When the touch panel 1131 detects the touch operation on or near the touch panel 1131, the touch operation is transmitted to the processor 1180 to determine the type of a touch event, and then the processor 1180 provides a corresponding visual output on the display panel 1141 according to the type of the touch event. Although in FIG. 11, the touch panel 1131 and the display panel 1141 are two independent components to realize input and input functions of the mobile phone, in some embodiments, the touch panel 1131 may be integrated with the display panel 1141 to achieve the input and output functions of the mobile phone.

The mobile phone may also include at least one sensor 1150, such as a light sensor, a motion sensor, and other sensors. Specifically, the light sensor may include an ambient light sensor and a proximity sensor, where the ambient light sensor may adjust brightness of the display panel 1141 according to the light and shade of ambient light, and the proximity sensor may turn off the display panel 1141 and/or backlight when the mobile phone moves to an ear. As a kind of motion sensor, an accelerometer sensor may detect a magnitude of acceleration in all directions (generally three axes), and detect a magnitude and direction of gravity when being stationary, and may be used to identify a mobile phone posture application (such as horizontal and vertical screen switching, related games, magnetometer posture calibration), a vibration recognition related function (such as a pedometer, knocking), etc. As for a gyroscope, a barometer, a hygrometer, a thermometer, an infrared sensor and other sensors that may also be configured in the mobile phone, they will not be repeated here.

The audio circuit 1160, a loudspeaker 1161 and a microphone 1162 may provide an audio interface between a user and the mobile phone. The audio circuit 1160 may transmit an electrical signal converted from received audio data to the loudspeaker 1161, and then the loudspeaker 1161 converts it into a sound signal for output. On the other hand, the microphone 1162 converts a collected sound signal into an electrical signal, which is received by the audio circuit 1160 and then converted into audio data. After the audio data is outputted to the processor 1180 for processing, the data is sent to another mobile phone via the RF circuit 1110, or the audio data is outputted to the memory 1120 for further processing.

WiFi belongs to a short-range wireless transmission technology. The mobile phone may help a user send and receive emails, browse web pages, access streaming media and do other things through the WiFi module 1170, which provides the user with wireless broadband Internet access. Although FIG. 11 shows the WiFi module 1170, it should be understood that it does not belong to a necessary composition of the mobile phone and may be omitted as needed without changing an essence of the present application.

The processor 1180 is a control center of the mobile phone, which uses various interfaces and lines to connect various parts of the entire mobile phone, and performs various functions and processes data of the mobile phone by running or executing software programs and/or modules stored in the memory 1120 and calling data stored within the memory 1120, so as to perform overall monitoring on the mobile phone. In an implementation, the processor 1180 may include one or more processing units. Preferably, the processor 1180 may integrate an application processor and a modem processor, where the application processor mainly processes an operating system, a user interface, an application program, etc., and the modem processor mainly processes wireless communication. It can be understood that the modem processor may not be integrated into the processor 1180.

The mobile phone further includes the power supply 1190 (such as a battery) that supplies power to various components. Preferably, the power supply may be logically connected to the processor 1180 through a power management system, thereby implementing the functions such as managing charging, discharging, and power consumption management through the power management system. Although not shown, the mobile phone may also include a camera, a Bluetooth module, etc., which will not be repeated here.

In an embodiment of the present application, the RF circuit 1110 is configured to receive first indication information sent by a network device, where the first indication information is used to indicate that a radio link between a terminal device and the network device is in an interrupted state;

The processor 1180 is configured to reset a MAC entity and/or stop N processes in the terminal device according to the first indication information, where N is an integer greater than or equal to 1.

In an implementation, the processor 1180 is further configured to start M processes of the N processes after stopping the N processes in the terminal device, where M is an integer greater than or equal to 1, and M is less than or equal to N.

In an implementation, the RF circuit 1110 is further configured to receive time indication information sent by the network device, where the time indication information includes first time information of the radio link being in the interrupted state, and/or second time information of the radio link being in a connected state.

In an implementation, the first time information includes at least one of the following:
  a starting time of the radio link being in the interrupted state, a time after the radio link is interrupted and within a duration of the interrupted state, a duration of the radio link being in the interrupted state, an ending time of the radio link being in the interrupted state.

In an implementation, the second time information includes at least one of the following:
  a starting time of the radio link being in the connected state, a time after the radio link is connected and within a duration of the connected state.

In an implementation, the processor 1180 is specifically configured to reset the MAC entity and/or stop the N processes in the terminal device according to the first indication information and the first time information.

In an implementation, the processor 1180 is specifically configured to start the M processes of the N processes according to the first time information and/or the second time information.

In an implementation, the processor 1180 is specifically configured to determine a first target time according to the first time information;
  reset the MAC entity and/or stop the N processes in the terminal device at the first target time according to the first indication information;
  where the first target time includes one of the following:
    a starting time of the radio link being in the interrupted state, a time after the radio link is interrupted and within a duration of the interrupted state.

In an implementation, the processor 1180 is specifically configured to determine a second target time according to the first time information and/or the second time information;
  start the M processes of the N processes at the second target time;
  where the second target time includes one of the following: an ending time of the radio link being in the interrupted state, a starting time of the radio link being in the interrupted state, a time after the radio link is interrupted and within a duration of the interrupted state.

In an implementation, the N processes include at least one of the following:
  stopping a channel sounding reference signal SRS transmission, stopping executing a beam measurement and/or a cell measurement, stopping reporting a result of the beam measurement and/or the cell measurement, stopping a random access attempt, stopping a radio link monitoring timer.

In an implementation, if the N processes include stopping the SRS transmission, then starting the M processes of the N processes includes starting the SRS transmission.

In an implementation, if the N processes include stopping executing the beam measurement and/or the cell measurement, then starting the M processes of the N processes includes starting the beam measurement and/or the cell measurement.

In an implementation, if the N processes include stopping reporting the result of the beam measurement and/or the cell measurement, then starting the M processes of the N processes includes starting to report the result of the beam measurement and/or the cell measurement.

In an implementation, if the N processes include stopping the random access attempt, then starting the M processes of the N processes includes starting the random access attempt.

In an implementation, the beam measurement and/or the cell measurement includes at least one of the following:
  an RRM measurement, an RLM measurement and a beam failure detection.

In an implementation, the RF circuit 1110 is further configured to receive second indication information sent by the network device before the processor 1180 resets the MAC entity and/or stops the N processes in the terminal device according to the first indication information, where the second indication information is used to indicate resetting the MAC entity, and/or indicate stopping the N processes.

In an implementation, the RF circuit 1110 is further configured to receive third indication information sent by the network device before starting the M processes of the N processes, where the third indication information is used to indicate starting the M processes of the N processes.

An embodiment of the present application further provides a computer-readable storage medium, including: computer instructions which, when run on a computer, cause the computer to execute various processes of the terminal device in the above method embodiments.

An embodiment of the present application further provides a computer-readable storage medium, including: computer instructions which, when run on a computer, cause the computer to execute various processes of the network device in the above method embodiments.

An embodiment of the present application further provides a computer program product including computer instructions, and when the computer program product is run on a computer, the computer runs the computer instructions to cause the computer to execute various processes of the terminal device in the above method embodiments.

An embodiment of the present application further provides a computer program product including computer instructions, and when the computer program product is run on a computer, the computer runs the computer instructions to cause the computer to execute various processes of the network device in the above method embodiments.

An embodiment of the present application further provides a chip. The chip is coupled with a memory in a terminal device, so that the chip calls program instructions stored in the memory at runtime, to cause the terminal device to execute various processes of the terminal device in the above method embodiments.

An embodiment of the present application further provides a chip. The chip is coupled with a memory in a network device, so that the chip calls program instructions stored in the memory at runtime, to cause the network device to execute various processes of the network device in the above method embodiments.

The above embodiments may be implemented in whole or in part by software, hardware, firmware or any combination thereof. When implemented in software, they may be implemented in whole or in part in a form of a computer program product. The computer program product includes one or more computer instructions. When the computer program instructions are loaded and executed on a computer, all or part of the processes or functions described in the embodiments of the present application are generated. The computer may be a general-purpose computer, a special-purpose computer, a computer network, or other programmable apparatuses. The computer instructions may be stored in a computer-readable storage medium or transmitted from one computer-readable storage medium to another computer-readable storage medium. For example, the computer instructions may be transmitted from a web site, computer, server or data center to another web site site, computer, server or data center in wired manner (such as a coaxial cable, an optical fiber, a digital subscriber line (DSL) or in wireless manner (such as infrared, wireless, microwave, etc.). The computer-readable storage medium may be any available medium that may be stored by a computer, or a data storage device such as a server and a data center integrated with one or more available media. The available medium may be a magnetic medium (e.g., a floppy disk, a hard disk, a magnetic tape), an optical medium (e.g., a digital video disc DVD), or a semiconductor medium (e.g., a solid state disk (SSD)), etc.

The terms "first", "second", "third", "fourth" and the like (if present) in the description, claims and drawings of the present application are used to distinguish similar objects, and do not have to be used to describe a specific order or sequence. It should be understood that the terms so used can be interchanged where appropriate, so that the embodiments described herein can be implemented in an order other than what is illustrated or described herein. In addition, the terms "include" and "have" and any variations thereof, are intended to cover non-exclusive inclusion. For example, processes, methods, systems, products or devices that include a series of steps or units need not be limited to those steps or units that are clearly listed, but can include other steps or units that are not clearly listed or are inherent to these processes, methods, products or devices.

What is claimed is:

1. A method for controlling a terminal device, comprising:
receiving first indication information sent by a network device, in a connected state of the terminal device, wherein the first indication information is used to indicate that a radio link between a terminal device and the network device will be in an interrupted state;
resetting a media access control (MAC) entity and/or stopping N processes in the terminal device according to the first indication information, wherein N is an integer greater than or equal to 1;
wherein the method further comprises:
receiving time indication information sent by the network device, wherein the time indication information comprises second time information of the radio link being in a connected state;
wherein the second time information comprises at least one of the following:
a starting time of the radio link being in the connected state, a time after the radio link is connected and within a duration of the connected state.

2. The method according to claim 1, after stopping the N processes in the terminal device, further comprising:
starting M processes of the N processes, wherein M is an integer greater than or equal to 1, and M is less than or equal to N.

3. The method according to claim 2, wherein the time indication information further comprises first time information of the radio link being in the interrupted state.

4. The method according to claim 3, wherein the first time information comprises at least one of the following:
a starting time of the radio link being in the interrupted state, a time after the radio link is interrupted and within a duration of the interrupted state, a duration of the radio link being in the interrupted state, an ending time of the radio link being in the interrupted state.

5. The method according to claim 3, wherein resetting the MAC entity and/or stopping the N processes in the terminal device according to the first indication information comprises:
resetting the MAC entity and/or stopping the N processes in the terminal device according to the first indication information and the first time information.

6. The method according to claim 3, wherein starting the M processes of the N processes comprises:
starting the M processes of the N processes according to the first time information and/or the second time information.

7. The method according to claim 5, wherein resetting the MAC entity and/or stopping the N processes in the terminal device according to the first indication information and the first time information comprises:
determining a first target time according to the first time information;
resetting the MAC entity and/or stopping the N processes in the terminal device at the first target time according to the first indication information;
wherein the first target time comprises one of the following: a starting time of the radio link being in the interrupted state, a time after the radio link is interrupted and within a duration of the interrupted state.

8. The method according to claim 6, wherein starting the M processes of the N processes according to the first time information and/or the second time information comprises:
determining a second target time according to the first time information and/or the second time information;

starting the M processes of the N processes at the second target time;
wherein the second target time comprises one of the following: an ending time of the radio link being in the interrupted state, a starting time of the radio link being in the interrupted state, a time after the radio link is interrupted and within a duration of the interrupted state.

9. The method according to claim 2, wherein the N processes comprise at least one of the following:
stopping a channel sounding reference signal (SRS) transmission, stopping executing a beam measurement and/or a cell measurement, stopping reporting a result of a beam measurement and/or a cell measurement, stopping a random access attempt, stopping a radio link monitoring timer.

10. The method according to claim 9, wherein if the N processes comprise stopping the channel SRS transmission, then starting the M processes of the N processes comprises starting the SRS transmission;
if the N processes comprise stopping executing the beam measurement and/or the cell measurement, then starting the M processes of the N processes comprises starting the beam measurement and/or the cell measurement;
if the N processes comprise stopping reporting the result of the beam measurement and/or the cell measurement, then starting the M processes of the N processes comprises starting to report the result of the beam measurement and/or the cell measurement;
if the N processes comprise stopping the random access attempt, then starting the M processes of the N processes comprises starting the random access attempt.

11. The method according to claim 1, before resetting the MAC entity and/or stopping the N processes in the terminal device according to the first indication information, further comprising:
receiving second indication information sent by the network device, wherein the second indication information is used to indicate resetting the MAC entity, and/or indicate stopping the N processes.

12. The method according to claim 2, before starting the M processes of the N processes, further comprising:
receiving third indication information sent by the network device, wherein the third indication information is used to indicate starting the M processes of the N processes.

13. A method for controlling a terminal device, comprising:
sending first indication information to the terminal device, in a connected state of the terminal device, wherein the first indication information is used to indicate that a radio link between the terminal device and a network device will be in an interrupted state;
wherein the method further comprises:
sending time indication information to the terminal device, wherein the time indication information comprises second time information of the radio link being in a connected state;
wherein the second time information comprises at least one of the following:
a starting time of the radio link being in the connected state, a time after the radio link is connected and within a duration of the connected state.

14. The method according to claim 13, wherein the time indication information further comprises first time information of the radio link being in the interrupted state.

15. The method according to claim 14, wherein the first time information comprises at least one of the following:
a starting time of the radio link being in the interrupted state, a time after the radio link is interrupted and within a duration of the interrupted state, a duration of the radio link being in the interrupted state, an ending time of the radio link being in the interrupted state.

16. The method according to claim 13, further comprising:
sending second indication information to the terminal device, wherein the second indication information is used to indicate resetting a media access control (MAC) entity, and/or indicate stopping N processes in the terminal device, wherein N is an integer greater than or equal to 1.

17. The method according to claim 16, further comprising:
sending third indication information to the terminal device, wherein the third indication information is used to indicate starting M processes of the N processes, wherein M is an integer greater than or equal to 1, and M is less than or equal to N.

18. The method according to claim 17, wherein the N processes comprises at least one of the following:
stopping a channel sounding reference signal (SRS) transmission, stopping executing a beam measurement and/or a cell measurement, stopping reporting a result of a beam measurement and/or a cell measurement, stopping a random access attempt, stopping a radio link monitoring timer;
wherein the beam measurement and/or the cell measurement comprises at least one of the following: a radio resource management (RRM) measurement, a radio link monitoring (RLM) measurement and a beam failure detection.

19. A terminal device, comprising: a processor, a memory, and a computer program that is stored on the memory and runnable on the processor, wherein when the computer program is executed by the processor, the processor is configured to:
receive first indication information sent by a network device, in a connected state of the terminal device, wherein the first indication information is used to indicate that a radio link between the terminal device and the network device will be in an interrupted state;
reset a media access control (MAC) entity and/or stop N processes in the terminal device according to the first indication information, wherein N is an integer greater than or equal to 1:
wherein the processor is further configured to:
receive time indication information sent by the network device, wherein the time indication information comprises second time information of the radio link being in a connected state;
wherein the second time information comprises at least one of the following:
a starting time of the radio link being in the connected state, a time after the radio link is connected and within a duration of the connected state.

20. A network device, comprising:
a processor, a memory, and a computer program that is stored on the memory and runnable on the processor, wherein when the computer program is executed by the processor, the method for controlling a terminal device according to claim 13 is implemented.

* * * * *